United States Patent [19]

Plank et al.

[11] 3,926,782

[45] Dec. 16, 1975

[54] HYDROCARBON CONVERSION

[75] Inventors: Charles J. Plank, Woodbury; Edward J. Rosinski, Almonesson, both of N.J.; Albert B. Schwartz, Philadelphia, Pa.

[73] Assignee: Mobil Oil Corporation, New York, N.Y.

[22] Filed: Feb. 9, 1973

[21] Appl. No.: 330,925

[52] U.S. Cl............. 208/135; 208/111; 260/671 R; 260/672 T
[51] Int. Cl.² ............... C10G 35/06; C10G 13/02; C07C 3/50
[58] Field of Search................... 208/135, 137, 111; 252/455 Z; 260/671 R

[56] References Cited
UNITED STATES PATENTS

| 2,882,244 | 4/1959 | Milton | 252/455 Z |
|---|---|---|---|
| 3,008,803 | 11/1961 | Milton | 423/328 |
| 3,298,780 | 1/1967 | Fleck | 208/111 |
| 3,310,373 | 3/1967 | Johnson | 252/455 Z |
| 3,313,594 | 4/1967 | Wilson | 252/455 Z |
| 3,323,876 | 6/1967 | Arey et al. | 252/455 Z |
| 3,458,454 | 7/1969 | Lapides et al. | 252/455 Z |
| 3,472,617 | 10/1969 | McDaniel et al. | 252/455 Z |
| 3,574,538 | 4/1971 | McDaniel et al. | 252/455 Z |
| 3,619,134 | 11/1971 | Park | 252/455 Z |
| 3,728,408 | 4/1973 | Tobias | 260/668 C |
| 3,751,504 | 8/1973 | Keown et al. | 260/672 T |
| 3,751,506 | 8/1973 | Burress | 260/671 R |
| 3,755,138 | 8/1973 | Chen | 208/111 |
| 3,755,145 | 8/1973 | Orkin | 252/455 Z |
| 3,756,942 | 9/1973 | Cattanach | 208/137 |
| 3,758,403 | 9/1973 | Rosinski et al. | 252/455 Z |
| 3,764,516 | 10/1973 | Steinmetz | 208/111 |
| 3,781,225 | 12/1973 | Schwartz | 252/455 Z |
| 3,790,471 | 2/1974 | Argawer et al. | 208/111 |

*Primary Examiner*—Delbert E. Gantz
*Assistant Examiner*—James W. Hellwege
*Attorney, Agent, or Firm*—Charles A. Huggett; Raymond W. Barclay

[57] ABSTRACT

This invention relates to a process for converting hydrocarbons in the presence of a catalyst comprising a crystalline aluminosilicate zeolite referred to as ZSM-5 type, which zeolite, as crystallized, is in the form of very small particles having diameters in the range of 0.005 micron to 0.1 micron. The use of such small crystallite ZSM-5 type zeolite as catalyst in hydrocarbon conversion has been found to retard catalyst aging during the hydrocarbon conversion reaction.

12 Claims, 6 Drawing Figures

FIGURE 1

EFFECT OF PARTICLE SIZE ON AGING

FIGURE 2

EFFECT OF PARTICLE SIZE ON AGING

FIGURE 5

HYDROCARBON CONVERSION

BACKGROUND OF THE INVENTION

1. Field of the Invention

This invention relates to hydrocarbon conversion in the presence of a crystalline aluminosilicate catalyst. More particularly, this invention relates to a process for converting hydrocarbons with a catalyst of ZSM-5 type zeolite having an ultimate particle diameter of 0.005 to 0.1 micron as crystallized.

2. Description of the Prior Art

The conversion of hydrocarbons in the presence of a ZSM-5-containing catalyst has heretofore been described in U.S. Pat. No. 3,702,886. Catalyst containing ion exchanged ZSM-5 crystals have been found to be useful in petroleum processes such as upgrading the octane number of naphthas and reformates, catalytic dewaxing of petroleum fractions, reduction in the pour point of distillate and residual fuel oils, reduction in the freeze point of jet fuels, alkylation of aromatics with olefins, aromatization of normally gaseous olefins and paraffins, aromatization of normally liquid low molecular weight paraffins and olefins and as a component for cracking catalyst. All of the foregoing catalytic processes are of value since they result in upgrading of the hydrocarbon charge being processed.

Along with other zeolite catalysts, those containing ZSM-5 have experienced a decline in catalytic activity with the duration of their use. Those skilled in the art of petroleum processing have sought means for extending the useful life of zeolite-containing catalysts. It would, as those in the art are aware, be of considerable practical advantage to retard the aging of a ZSM-5-containing zeolite catalyst during its use in hydrocarbon processing.

SUMMARY OF THE INVENTION

In accordance with the invention described herein, it has been found that the use of one or more members of the family of zeolites designated as ZSM-5, characterized by an ultimate particle diameter of 0.005 to 0.1 micron when crystallized, as the catalyst unexpectedly serves to retard aging of such catalyst during operations involving catalytic processing of hydrocarbon charge stocks carried out in the presence of ZSM-5 type containing catalysts.

The family of crystalline aluminosilicate zeolites known as the ZSM-5 type are more particularly described in U.S. Pat. No. 3,702,886, the disclosure of which is incorporated herein by reference. These crystalline aluminosilicates are characterized by a silica/alumina mole ratio of greater than 5 and more precisely in the anhydrous state by the general formula:

$$0.9 \pm 0.2\ M_{2/n}O : Al_2O_3 : 5\text{--}300\ SiO_2$$

wherein M is selected from the group consisting of a mixture of alkali metal cations and organo ammonium cations, particularly a mixture of sodium and tetraalkyl ammonium cations, the alkyl groups of which preferably contain 2 to 5 carbon atoms. The term "anhydrous" as used in the above context means that molecular water is not included in the formula. In a more specific embodiment, the mole ratio of $SiO_2$ to $Al_2O_3$ in the above formula is 5–100 and preferably 15–100.

The original cations can be replaced in accordance with techniques well known in the art, at least in part, by ion exchange with other cations. Preferred replacing cations include alkylammonium cations, metal ions, ammonium ions, hydrogen ions and mixtures of the same. Particularly preferred cations are those which render the zeolite catalytically active. These include hydrogen, rare earth metals, aluminum, metals of Groups II and VIII of the Periodic Table and manganese. Also desired are zeolites which are thermally treated products of the foregoing, said thermal treatment consisting of heating the ZSM-5 type zeolite in the desired particular cation form at a temperature of at least 700°F.

Members of the family of ZSM-5 zeolites possess a definite distinguishing crystalline structure whose X-ray diffraction pattern shows the following significant lines:

TABLE 1

| Interplanar spacing d(A): | Relative intensity |
|---|---|
| 11.1 ± 0.2 | s. |
| 10.0 ± 0.2 | s. |
| 7.4 ± 0.15 | w. |
| 7.1 ± 0.15 | w. |
| 6.3 ± 0.1 | w. |
| 6.04 ± 0.1 | w. |
| 5.97 | |
| 5.56 ± 0.1 | w. |
| 5.01 ± 0.1 | w. |
| 4.60 ± 0.08 | w. |
| 4.25 ± 0.08 | w. |
| 3.85 ± 0.07 | v.s. |
| 3.71 ± 0.05 | s. |
| 3.04 ± 0.03 | w. |
| 2.99 ± 0.02 | w. |
| 2.94 ± 0.02 | w. |

These values were determined by standard techniques. The radiation was the K-alpha doublet of copper, and a scintillation counter spectrometer with a strip chart pen recorder was used. The peak heights, I, and the positions as a function of 2 times theta, where theta is the Bragg angle, were read from the spectrometer chart. From these, the relative intensities, $100\ I/I_o$, where $I_o$ is the intensity of the strongest line or peak, and $d$ (obs.), the interplanar spacing in A, corresponding to the recorded lines, were calculated. In the above tabulation, the relative intensities are given in terms of the symbols s = strong, w = weak and vs = very strong.

Zeolite ZSM-5 as the catalyst for use in the hydrocarbon conversion reactions described herein can be suitably prepared by preparing a solution containing sources of tetrapropyl ammonium hydroxide, sodium oxide, an oxide of aluminum, an oxide of silicon and water having a composition falling within the following ranges:

| | Broad | Preferred | Particularly Preferred |
|---|---|---|---|
| OH⁻/SiO₂ | 0.07–1.0 | 0.1–0.8 | 0.2–0.75 |
| R₄N⁺/(R₄N⁺+Na⁺) | 0.2–0.95 | 0.3–0.9 | 0.4–0.9 |
| H₂O/OH⁻ | 10–300 | 10–300 | 10–300 |
| SiO₂/Al₂O₃ | >5 | 5–300 | 15–300 | where R is propyl. To produce very small ZSM-5 crystals in the range of 0.005 to 0.1 micron in ultimate particle diameter, high speed stirring and concomitant high mass transfer rates during production of the crystals is carried out. The crystalline product of such small size range may be loosely agglomerated without detrimental effects. Alternatively, there may be employed: an amine, suitably tri-n-propylamine; quaternary alkyl ammonium salts such as, tetra-n-propyl ammonium bromide or a mixture of tri-n-propylamine and n-propyl bromide, dissolved in a suitable solvent such as methylethyl ketone. Typical conditions maintained during crystallization include a temperature in the range of about 75°C to 205°C for a period of time from 1 hour to 60 days. Preferably, the temperature is maintained in the range of about 90°C to about 110°C., up to about 4 days while maintaining stirring; it may thereafter be raised to about 160°C. to accelerate crystallization to completion. The reaction mixture during crystallization is subjected to high speed agitation with concomitant high mass transfer rates.

ZSM-5 type zeolite can be prepared utilizing materials which supply the appropriate oxide. Such compositions include sodium aluminate, alumina, sodium silicate, silica hydrosol, silica gel, silicic acid, sodium hydroxide and tetra-propyl ammonium compounds, e.g., tetra-propyl ammonium hydroxide. It will be understood that each oxide component utilized in the reaction mixture for preparing a member of the ZSM-5 family can be supplied by one or more initial reactants and they can be mixed together in any order. For example, sodium oxide can be supplied by an aqueous solution of sodium hydroxide, or by an aqueous solution of sodium silicate; tetra-propyl ammonium cation can be supplied by the bromide salt.

Members of the ZSM-5 family can have the original cations associated therewith replaced by a wide variety of other cations according to techniques well known in the art. Typical replacing cations would include hydrogen, ammonium and metal cations including mixtures of the same. Of the replacing metallic cations, particular preference is given to cations of metals such as rare earth metals, manganese, calcium, as well as metals of Group II of the Periodic Table, e.g., zinc, and Group VIII of the Periodic Table, e.g., nickel.

Typical ion exchange techniques would be to contact the members of the family of ZSM-5 zeolites with a salt of the desired replacing cation or cations. Although a wide variety of salts can be employed, particular preference is given to chlorides, nitrates and sulfates.

Representative ion exchange techniques are disclosed is a wide variety of patents including U.S. Pat. No. 3,140,249; U.S. Pat. No. 3,140,251 and U.S. Pat. No. 3,140,253.

Following contact with the salt solution of the desired replacing cation, the zeolites are then preferably washed with water and dried at a temperature ranging from 150°F. to about 600°F. and thereafter calcined in air, steam, inert gases or mixtures thereof at temperatures ranging from about 500°F. to 1600°F. for periods of time ranging from 1 to 48 hours or more.

In the case of many catalysts, it is desired to incorporate the ZSM-5 with another material resistant to the temperatures and other conditions employed in organic conversion processes. Such materials include active and inactive materials and synthetic or naturally occurring zeolites as well as inorganic materials such as clays, silica and/or metal oxides. The latter may be either naturally occurring or in the form of gelatinous precipitates or gels including mixtures of silica and metal oxides. Use of a material in conjunction with the ZSM-5, i.e., combined therewith which is active, tends to improve the conversion and/or selectivity of the catalyst in certain organic conversion processes. Inactive materials may suitably serve as diluents to control the amount of conversion in a given process so that products can be obtained economically and orderly without employing other means for controlling the rate of reaction. Normally, zeolite materials have been incorporated into naturally occurring clays, e.g., bentonite and kaolin, to improve the crush strength of the catalyst under commercial operating conditions. These materials, i.e., clays or inorganic oxides, function, in part, as binders for the catalyst. It is desirable to provide a catalyst having good crush strength, because in a petroleum refinery the catalyst is often subjected to rough handling, which tends to break the catalyst down into powder-like materials which cause problems in processing. These clay binders have been employed for the purpose of improving the crush strength of the catalyst.

Naturally occurring clays which can be composited with the ZSM-5 catalyst include those of the montmorillonite and kaolin family, which families include the sub-bentonites, and the kaolins commonly known as Dixie, McNamee, Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the ZSM-5 catalyst can be composited with a porous matrix material such as alumina, silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The matrix can be in the form of a cogel. The relative proportions of finely divided crystalline aluminosilicate ZSM-5 and inorganic oxide gel matrix vary widely with the crystalline aluminosilicate content ranging from about 1 to about 90 percent by weight and more usually, from about 2 to about 70 percent by weight of the composite.

ZSM-5 zeolites can be used either in the alkali metal form (e.g., the sodium form), the ammonium form, the hydrogen form, or another univalent or multivalent cationic form. Preferably, forms other than those of the alkali metals are employed. They can also be used in intimate combination with a hydrogenating component such as tungsten, vanadium, molybdenum, rhenium, nickel, cobalt, chromium, manganese or a noble metal such as platinum or palladium where a hydrogenation/dehydrogenation function is to be performed. Such component can be exchanged into the composition, impregnated therein or physically intimately admixed therewith. Such component can be impregnated in or on the ZSM-5 such as, for example, by, in the case of platinum, treating the zeolite with a platinum metal-containing ion. Thus, suitable platinum compounds include chloroplatinic acid, platinous chloride and various compounds containing the platinum ammine complex.

Use of the very small crystallite size ZSM-5-containing catalyst, i.e., 0.005 to 0.1 micron in diameter, has, in accordance with the present invention, been found to result in retardation of aging of such catalyst during various hydrocarbon conversion reactions, including upgrading of reformate, transalkylation of aromatic hydrocarbons, alkylation of aromatics, reduction in the pour point of fuel oils and in catalytic cracking of hydrocarbons. Exemplary of such processes is the upgrading of naphthas or reformates. The use of the small crystallite size ZSM-5 catalyst in such operation has been found not only to result in retarding the aging of the ZSM-5 catalyst but also may give rise to improved yield-octane through use of decreased hydrogen/hydrocarbon ratio while retaining satisfactory aging during naphtha or reformate processing.

Thus, in accordance with the process of the present invention, it has been found that the use of very small ZSM-5 crystallites, 0.005 to 0.1 micron in ultimate particle diameter, unexpectedly results in retarding the aging of catalysts containing such ZSM-5 crystals during hydrocarbon processing. As noted hereinabove, the extremely small crystallite size of ZSM-5 may be achieved as a result of high speed stirring to give high mass transfer rates and high shear of the reaction mixture during the process of crystallization. In addition, it has been found that the use of temperatures below about 110°C. during the initial period of crystallization and controlled within the aforenoted range during crystallization further results in optimum production of ZSM-5 crystallites having the desired ultimate particle size.

Reformates or reformer effluents which are composed substantially of aromatic and paraffinic constituents can be prepared according to conventional techniques by contacting any suitable material such as naphtha charge material boiling in the range of about $C_5$ and preferably from about $C_6$ up to about 380°F. and higher with hydrogen at least initially in contact with any conventional reforming catalyst. This is a conventional reforming operation which involves a net production of hydrogen and is disclosed in greater detail in U.S. Pat. No. 3,395,094.

The process for upgrading reformates wherein ZSM-5 zeolite of ultimate particle diameter 0.005 to 0.1 micron is employed, generally involves contact during processing with a reformate or reformer effluent, with or without added hydrogen, at a temperature between 500°F. and about 1,000°F and preferably between about 550°F. and about 900°F. The reactor pressure in such operation is generally within the range of about 25 and about 2000 psig and preferably about 50 to about 1,000 psig. The liquid hourly space velocity, i.e., the liquid volume of hydrocarbon per hour per volume of catalyst is about 0.1 and 250, and preferably between about 1 and 100. Although hydrogen is not essential to this process, when it is used the molar ratio of hydrogen to hydrocarbon charge employed is between about 0.1 and about 80 and preferably between about 1 and about 10.

It may be desirable in some instances to add a hydrogenation/dehydrogenation component to the ZSM-5 zeolite crystals. The amount of the hydrogenation/dehydrogenation component employed is not narrowly critical and can range from about 0.01 to about 30 weight percent based on the entire catalyst. A variety of hydrogenation components may be combined with either the zeolite and/or matrix in any feasible manner which affords intimate contact of the components, employing well known techniques such as base exchange, impregnation, coprecipitation, cogellation, mechanical admixture of one component with the other and the like. The hydrogenation component can include metals, oxides and sulfides of metals of the Periodic Table which fall in Group VIB including chromium, molybdenum, tungsten and the like; Group IIB including zinc and cadmium, Group VIIB including manganese and rhenium and Group VIII including cobalt, nickel, platinum, palladium, ruthenium, rhodium and the like, and combinations of metals, sulfides and oxides of metals of Groups VIB and VIII such as nickel-tungsten-sulfide, cobalt oxide-molybdenum oxide and the like.

The pre-treatment before use varies depending on the hydrogenation component present. For example, with components such as nickel-tungsten and cobalt molybdenum, the catalyst may desirably be sulfided. With metals like platinum or palladium, a hydrogenation step may be employed. These techniques are well known in the art and are accomplished in a conventional manner.

Catalyst made with small size ZSM-5 crystals (0.005–0.1 micron in ultimate particle, i.e., individual crystallite diameter) has been found to age at a significantly slower rate than corresponding ZSM-5-containing catalysts of appreciably larger crystallite size (0.1–0.5 micron in ultimate particle, i.e., individual crystallite diameter). This superior stability may be used to achieve improved yield-octane through use of decreased hydrogen/hydrocarbon ratio while retaining satisfactory aging. By way of example, in 23 days of processing a $C_6$-242°F. reformate at 200 psig, 600°F. and 2.7 WHSV, aging (loss of product octane number with time) with the small size crystallite ZSM-5 catalyst at 1/1 hydrogen/hydrocarbon ratio, was only 80 percent of that of a comparable catalyst but of larger crystallite size, i.e., 0.1–0.5 micron in diameter, at 2/1 hydrogen/hydrocarbon ratio; and $C_5^+$ yield was 1.5 volume percent greater at 94 clear product research octane number. At a fixed hydrogen/hydrocarbon ratio (2/1), on the other hand, the small size crystallized ZSM-5 catalyst provided the same yield-octane as the larger crystallite size catalyst but aged at approximately one-half the rate.

DESCRIPTION OF SPECIFIC EMBODIMENTS

EXAMPLE 1

A reaction mixture was prepared by intimately mixing two solutions at room temperature in a ½ inch normal pipe thread Venturi mixing nozzle. The two solutions were designated as Solution A and Solution B. Solution A was prepared by stirring into 86.4 lbs. of water

| 1.62 lb. | of | $Al_2(SO_4)_3 \times H_2O$ | (MW = 595) |
| 18.95 lb. | of | NaCl | |
| 4.22 lb. | of | $H_2SO_4$ (97%) | |

Solution B was prepared by stirring into 63.4 lbs. of water 50.6 lb. of Q-brand water glass (28.9 wt. % $SiO_2$, 8.9 wt. % $Na_2O$, balance $H_2O$)

The resulting mixture was discharged into a 30 gallon baffled pressure autoclave. Then 3.41 lbs. of tri-normal-propylamine were charged to the autoclave followed by 5.64 lbs. of methylethyl ketone and 2.93 lbs. of n-propyl bromide. The latter three organic materials mix and form an organic layer overlying the aqueous gel formed by the mixing of Solutions A and B. The autoclave was then closed and heated without stirring for approximately two hours until the temperature reached about 250°F. The autoclave was then maintained at this temperature, without stirring, for 13 hours. Thereafter, the autoclave stirrer was started with a rotor speed of 167 rpm and the temperature was raised during vigorous stirring to 320°F. The autoclave was held at 320°F. for 9.3 hours, after which it was opened to the atmosphere to flash off residual organic matter and then cooled to room temperature.

The product was discharged from the autoclave, water washed to 0.01 weight percent residual chloride (based on samples dried at 1,100°F.) and dried at 250°F. The product obtained was crystalline and identified by X-ray analysis as ZSM-5. Photomicrographs at 64,000 times magnification showed that the diameter of the individual crystallites was about 0.1 micron and that the crystallites were agglomerated to particles of about 1 micron in diameter.

The crystalline product was then formed into tablets having a diameter of ½ inch and a thickness of ¼ inch. These tablets were crushed to produce 12 × 16-mesh particles that were then calcined in air at 750°F. for 3 hours. The calcined particles were ion exchanged by treatment 4 times for 1 hour each at room temperature with 5 cc of 5 percent aqueous ammonium chloride per gram of ZSM-5. The particles were then washed with water at room temperature, after which they were exchanged by treatment for 4 hours at 190°F. with 5 cc of one normal aqueous nickel nitrate per gram of ZSM-5. The particles were then water washed free of nickel ions and then heated at 250°F. and finally calcined in air at 1,000°F. for 3 hours. The resulting catalyst composition contains 0.28 weight percent nickel.

EXAMPLE 2

A catalyst was made by the same general procedure as that of Example 1 except for the following changes:
1. Solution A was prepared by stirring into 369 lbs. of water:

| | | |
|---|---|---|
| 6.6 lbs. | of | $Al_2(SO_4)_3 \times H_2O$ (MW = 595) |
| 27 lbs. | of | tetra-n-propylammonium bromide |
| 81 lbs. | of | NaCl |
| 18 lbs. | of | $H_2SO_4$ (97%) |

2. Solution B contained:
   216 lbs. of Q-brand water glass 270 lbs. of $H_2O$
3. The crystallization was performed at 210°F. and atmospheric pressure for 6 days in a 200 gallon crystallizer and water was periodically added to make up for loss by evaporation.
4. Stirring was more vigorous than in Example 1. The rotor was operated at as high a velocity as possible without causing the vessel contents to overflow. Stirring velocity was periodically reduced to meet this requirement because the fluidity of the reaction mixture increased with time.
5. The product of crystallization was identified by X-ray analysis as 90 percent ZSM-5. Photomicrographs at 64,000 times magnification indicated that the diameter of the individual crystallites was about 0.03 micron and that the crystallite agglomerates were 0.1–0.3 micron in diameter.
6. The tablets of crystallites were crushed to 28 × 60-mesh particles.
7. The nickel exchange was with 10 cc of 0.5 normal nickel nitrate per gram of ZSM-5.
8. Final calcination was for a period of 10 hours. The catalyst so prepared contained 0.34 weight percent nickel.

EXAMPLE 3

A catalyst was made by the same general procedure as that of Example 1, except for the following changes:

1. Solution A was prepared by stirring into 72.2 lbs. of water

| | | | |
|---|---|---|---|
| 1.44 lb. | of | $Al_2(SO_4)_3 \times H_2O$ | (MW = 595) |
| 15.8 lb. | of | NaCl | |
| 3.52 lb. | of | $H_2SO_4$ (97%) | |

2. Solution B was prepared by stirring into 52.8 lbs. of water
   42.2 lbs. of Q-brand water glass
3. The organic layer was made by mixing 2.84 lbs. of tri-n-propylamine and 2.44 lbs. of n-propyl bromide.
4. As soon as the autoclave was closed, the temperature was raised directly to 320°F. with stirring at a rotor speed of 76 rpm and held at that temperature for 13.7 hours.
5. Photomicrographs indicated that the crystallites were agglomerated and that the individual crystallites were 0.5 × 1-micron thin platelets.
6. Instead of being tableted, the crystallites were then combined with alumina as follows: Highly pure $Al_2O_3$ was hydrated for 16 hours at 200°F. producing a hydrate containing 53 percent water. This product was mixed with ZSM-5 crystallites to give a paste containing about 39 percent water and extruded into a hydraulic extruder to produce 1/16 inch extrudate. The extrudate was dried and thereafter processed like the crushed tablets of Example 1. The resulting catalyst composition contained 65 weight percent ion-exchanged ZSM-5, 35 percent $Al_2O_3$ and 0.49 percent nickel.

EXAMPLE 4

A catalyst was made by the same procedure as that of Example 3, except for the following changes:
1. Solution A was prepared by stirring into 72 lbs. of water

| | |
|---|---|
| 1.35 lb. | $Al_2(SO_4)_3 \times H_2O$ (MW = 595) |
| 15.8 lb. | NaCl |
| 5.27 lb. | tetra-n-propylammonium bromide |
| 3.52 lb. | $H_2SO_4$ (97%) |

2. A time of 8 hours at 320°F. was used for crystallization and stirring was at a rotor speed of 121 rpm.
3. The product of crystallization was identified by X-ray analysis as 95 percent ZSM-5. Photomicrographs indicated that the crystallite agglomerates were 0.5–0.7 micron in diameter and that the diameter of individual crystallites was about 0.05–0.07 micron.

The resulting catalyst composition contained 65 weight percent ion-exchanged ZSM-5, 35 percent $Al_2O_3$ and 0.47 percent nickel.

The catalysts of Examples 1 and 2 were tested for loss of activity with time (aging) during static-bed processing of a $C_6$–265°F. reformate at 200 psig total pressure, an inlet molar ratio of hydrogen to hydrocarbon of 1, a temperature of 600°F. and 6 weight hourly space velocity. The results of testing the catalysts of Examples 1 and 2 are shown respectively in Table 1 and in Table 2 set forth below:

TABLE 1

| AGING OF CATALYST OF EXAMPLE 1 | | |
|---|---|---|
| Days on Stream | Oct. No. of $C_5^+$ Product | |
| | R + 0 | R + 3 |
| 2.7 | 92.9 | 101.9 |

TABLE 1-continued

AGING OF CATALYST OF EXAMPLE 1

| Days on Stream | Oct. No. of $C_5^+$ Product | |
| --- | --- | --- |
| | R + 0 | R + 3 |
| 4.7 | 90.8 | 101.0 |

TABLE 2

AGING OF CATALYST OF EXAMPLE 2

| Days on Stream | Oct. No. of $C_5^+$ Product | |
| --- | --- | --- |
| | R + 0 | R + 3 |
| 2.5 | 96.0 | 103.6 |
| 4.0 | 96.2 | 103.4 |
| 7.4 | 95.2 | 102.8 |
| 9.4 | 94.4 | 103.0 |
| 11.8 | 94.7 | 102.5 |

Figure 1:
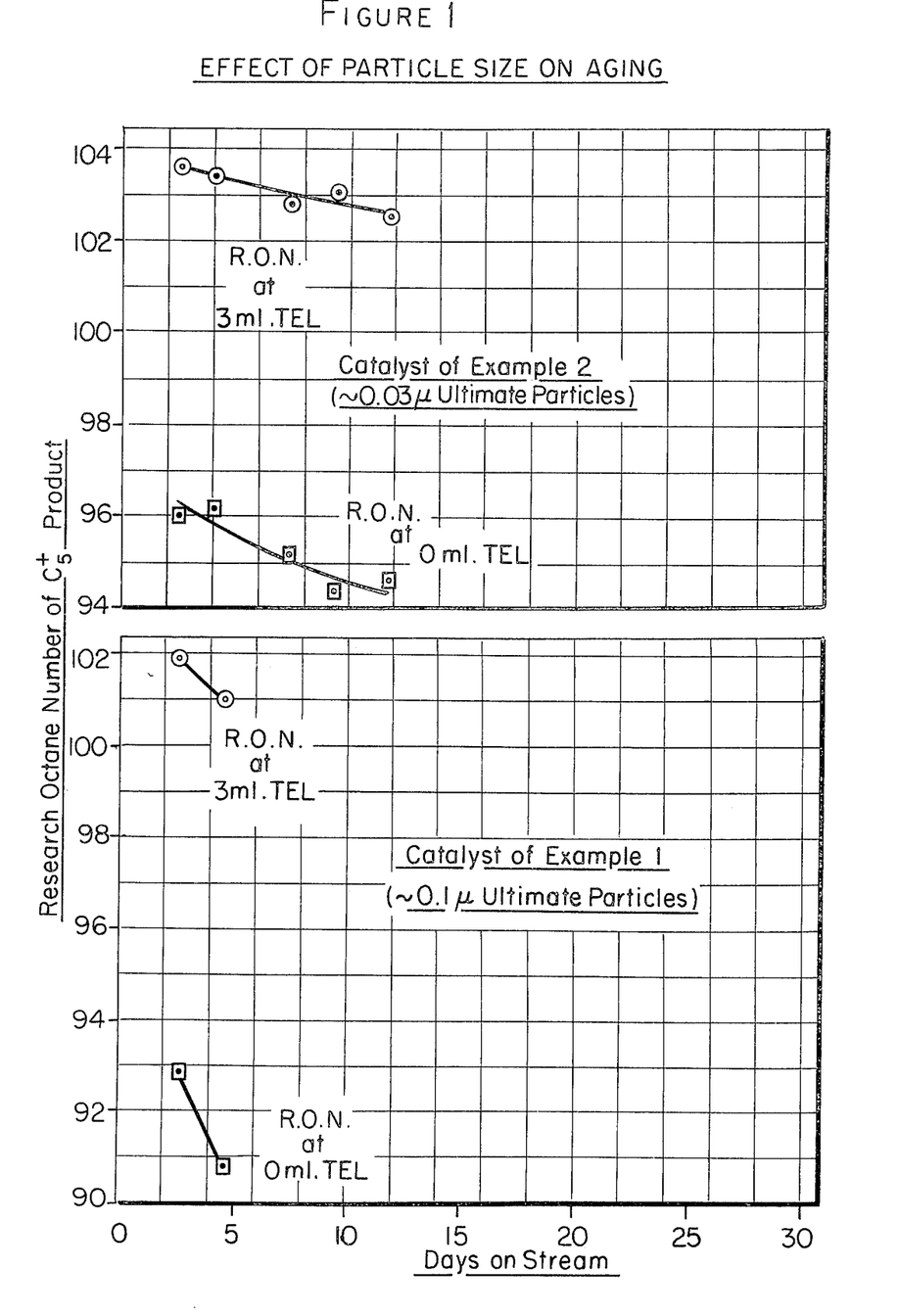

Performance results for the catalysts of Examples 1 and 2 are shown in FIG. 1. Referring to this figure, the activity of the catalyst is indicated by the octane number to which the feed stock (which has an unleaded R.O.N. of 79.0 ± 0.3 and a leaded O.N. at 3 ml. T.E.L. of 94.2 ± 0.1) is raised by processing of the catalysts. Decline in activity, i.e., aging, is indicated by decreasing octane number. It will thus be seen from FIG. 1 that the catalyst of Example 2 ages much slower and thus, is more stable than the catalyst of Example 1.

The catalysts of Examples 3 and 4 were tested for aging during static bed processing of a $C_6$ —265°F. reformate at 400 psig total pressure, an inlet molar ratio of hydrogen to hydrocarbon of 5, a temperature of 600°F. and about 3.5 weight hourly space velocity. The performance results for the catalysts of Examples 3 and 4 are respectively shown below in Tables 3 and 4.

TABLE 3

AGING OF CATALYST OF EXAMPLE 3

| Days on Stream | Res. Oct. No. of $C_5^+$ Product | |
| --- | --- | --- |
| | 0 ml. TEL | 3 ml. TEL |
| 2.0 | 96.0 | 104.6 |
| 3.9 | 96.1 | 105.6 |
| 5.9 | 95.0 | 104.0 |
| 7.9 | 95.7 | 103.9 |
| 10.1 | 95.8 | 103.5 |
| 11.9 | 95.5 | 103.5 |
| 13.9 | 95.2 | 103.7 |
| 15.5 | 95.0 | 103.6 |
| 17.5 | 95.4 | 103.2 |
| 19.5 | 94.9 | 103.0 |

TABLE 4

AGING OF CATALYST OF EXAMPLE 4

| Days on Stream | Res. Oct. No. of $C_5^+$ Product | |
| --- | --- | --- |
| | 0 ml. TEL | 3 ml. TEL |
| 8.2$^{(a)}$ | — | — |
| 11.4 | 93.9 | 102.4 |
| 13.9 | 93.6 | 102.3 |
| 16.2 | 93.6 | 102.4 |
| 18.2 | 93.5 | 102.2 |
| 20.2 | 94.4 | 102.3 |
| 22.2 | 93.4 | 102.8 |
| 24.2 | 94.2 | 102.0 |
| 26.2 | 93.9 | 102.5 |

$^{(a)}$ Until 8.2 days on stream, run was at 1.8 WHSV.

Figure 2:
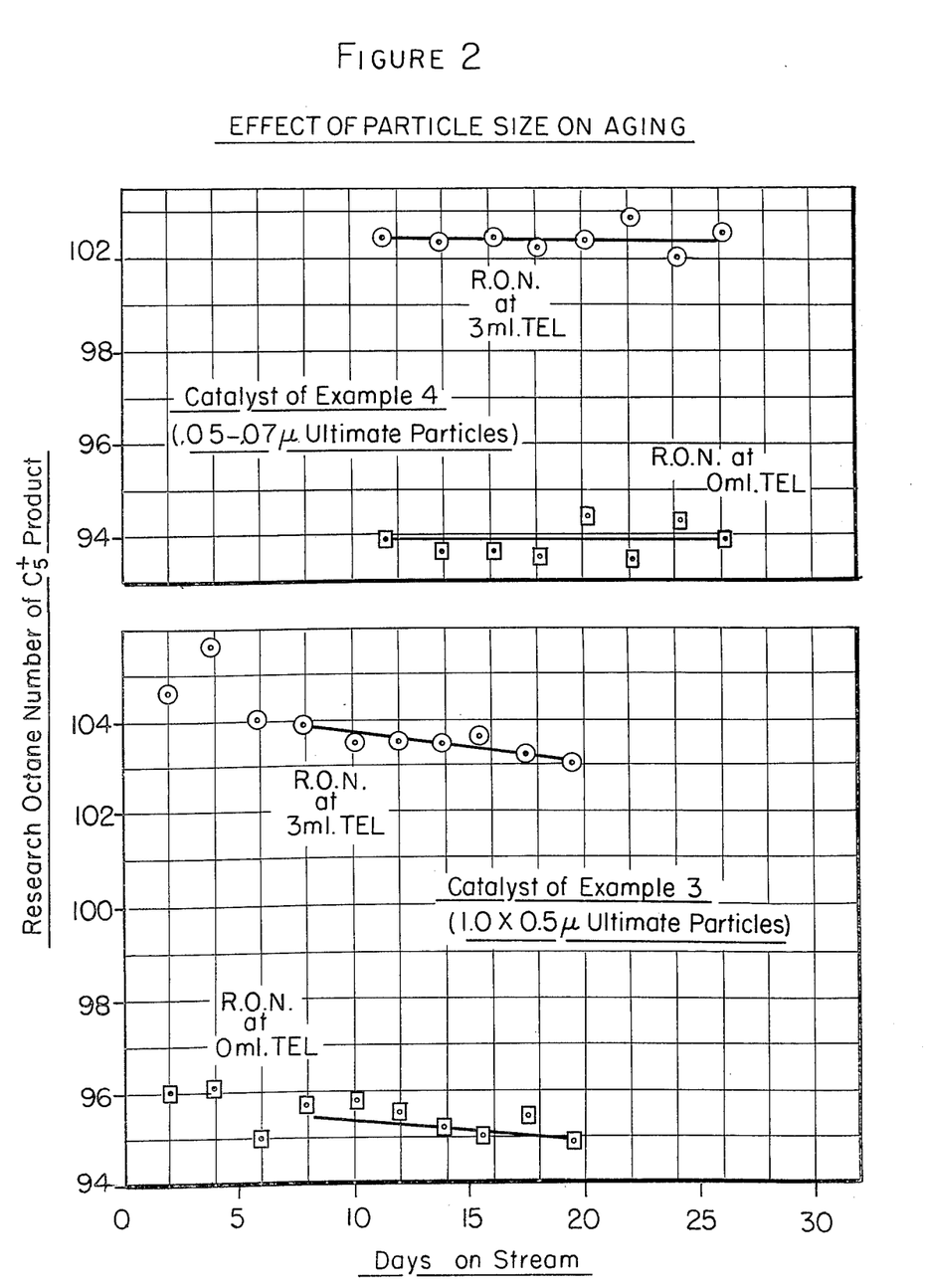

A direct comparison of the results obtained with the catalysts of Examples 3 and 4 is shown in FIG. 2. Referring to this figure, it is evident that the catalyst of Example 4 ages much slower and is more stable than the catalyst of Example 3.

EXAMPLE 5

ZSM-5 crystallites were made by the same procedure as that of Example 1 except for the following changes:
1. The period during which autoclave was held at about 250°F. without stirring was 13.8 rather than 13 hours.
2. The stirring at 320°F. was more vigorous (rotor speed was 218 rather than 167 rpm) and the period at 320°F. was 5.6 hours rather than 9.3 hours.

The product obtained was crystalline and was identified as 85 percent ZSM-5. Photomicrographs indicated that the crystallite agglomerates were 0.5–1.0 micron in diameter and that the diameter of the individual crystallites was about 0.05 micron.

EXAMPLE 6

A catalyst was made by the same general procedure as that of Example 3 except for the following changes:
1. The period of digestion without stirring in the autoclave was 17.5 hours at 210°F. rather than 13 hours at about 250°F.
2. The period of crystallization with stirring was 4.3 hours at a stirrer speed of 315 rpm rather than 9.3 hours at 167 rpm. The crystallites thus produced were agglomerated into particles about 0.25 to 0.5 micron in diameter and the diameter of the individual crystallites was 0.1–0.2 micron. The crystallites were then combined with alumina essentially as in Examples 3 and 4 with the following minor differences: (a) calcining before ion exchange was in nitrogen at 1000°F. rather than in air at 700°F. and (b) final calcining was for 3 hours rather than 10 hours. The finished catalyst contained 0.99 weight percent nickel.

EXAMPLE 7

A catalyst was made by the same general procedure as that in Example 2 except for the following changes:
1. Crystallization time was 7 days rather than 6 days.

The individual crystallites produced were about 0.02 micron in diameter and the agglomerates were about 0.1 micron in diameter. The crystallites were then combined with alumina in accordance with the method of Example 6. The finished catalyst contained 0.34 weight percent nickel.

EXAMPLE 8

A catalyst was made by the same general procedure as that of Example 6 except for the following changes:
1. The period of crystallization with stirring was 83.5 hours at 220°F. rather than 4.2 hours at 320°F.
2. The period of digestion without stirring in the autoclave was 5 hours at 225°F. rather than 17.5 hours at 210°F.
3. Stirrer speed during crystallization was 300 rpm rather than 315 rpm and
4. A 5 gallon autoclave was used instead of 30 gallons and the quantities of starting materials were appropriately reduced.

The individual ZSM-5 crystallites produced in this example were 0.01–0.02 micron in diameter and the agglomerates were about 0.1 micron in diameter. The nickel content of the finished product was 0.96 weight percent.

The catalyst of Example 6 was tested for loss of activity with time (aging) during static bed processing of a $C_6$ - 242°F. reformate at 200 psig total pressure, an inlet molar ratio of hydrogen to hydrocarbon of 2, a temperature of 600°F. and 2.7 weight hourly space velocity. The results are presented in Table 5 below:

TABLE 5

AGING OF CATALYST OF EXAMPLE 6

| Days on Stream | Res. Oct. No. of $C_5^+$ Product | |
|---|---|---|
| | 0 ml. TEL | 3 ml. TEL |
| 2.0 | 95.5 | 103.5 |
| 4.0 | 95.2 | 102.6 |
| 6.0 | 93.6 | 102.8 |
| 8.3 | 93.1 | 102.5 |
| 10.3 | 93.2 | 101.8 |
| 12.3 | 93.1 | 102.1 |
| 14.3 | 92.1 | 101.6 |
| 16.3 | 92.1 | 101.9 |
| 18.3 | 92.7 | 101.9 |
| 20.3 | 91.9 | 101.6 |
| 22.3 | 91.6 | 101.5 |
| 24.3 | 90.8 | 101.2 |
| 26.3 | 91.2 | 101.4 |

Figure 3:
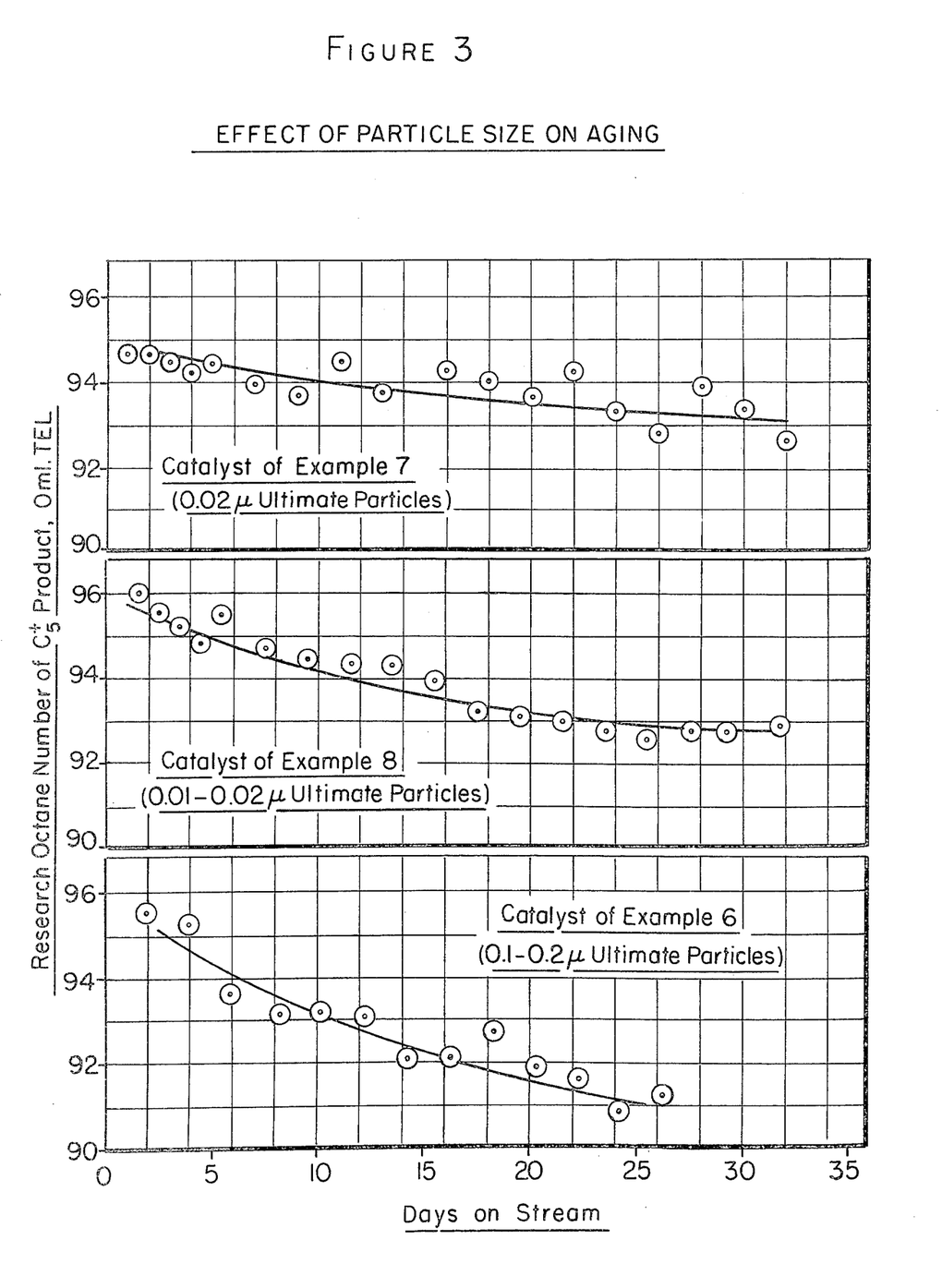
Figure 4:
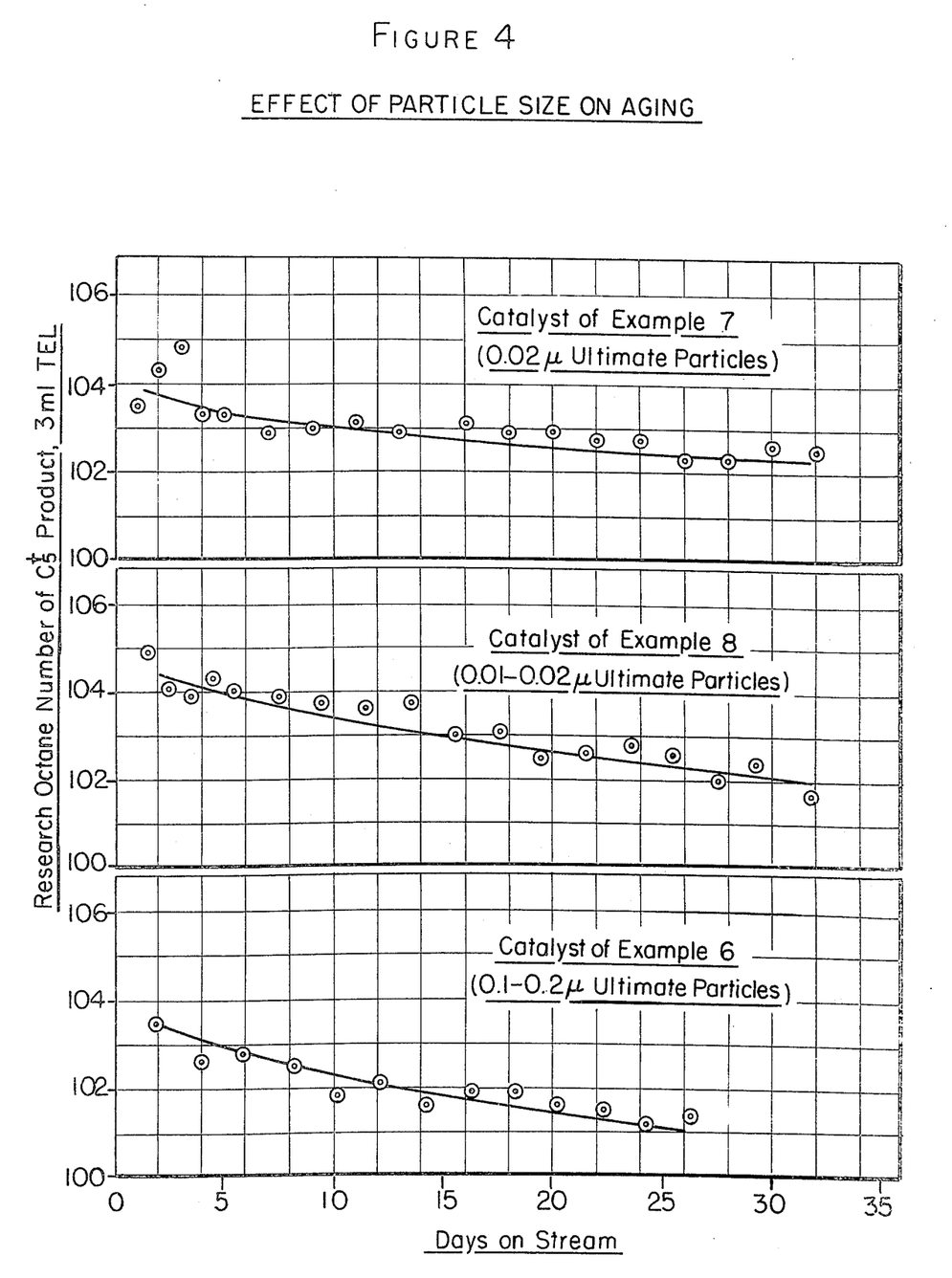

The results are also shown in FIGS. 3 and 4.

The catalyst of Example 7 was tested under substantially the same conditions as those of Example 6. The results of such testing are presented in Table 6 below:

TABLE 6

AGING OF CATALYST OF EXAMPLE 7

| Days on Stream | Res. Oct. No. of $C_5^+$ Product | |
|---|---|---|
| | 0 ml. TEL | 3 ml. TEL |
| 1.0 | 94.6 | 103.5 |
| 2.0 | 94.6 | 104.3 |
| 3.0 | 94.4 | 104.8 |
| 4.0 | 94.2 | 103.3 |
| 5.0 | 94.4 | 103.3 |
| 7.0 | 93.9 | 102.9 |
| 9.0 | 93.7 | 103.0 |
| 11.0 | 94.4 | 103.1 |
| 13.0 | 93.7 | 102.9 |
| 16.0 | 94.2 | 103.1 |
| 18.0 | 94.0 | 102.9 |
| 20.0 | 93.6 | 102.9 |
| 22.0 | 94.2 | 102.7 |
| 24.0 | 93.3 | 102.7 |
| 26.0 | 92.8 | 102.3 |
| 28.0 | 93.9 | 102.3 |
| 30.0 | 93.3 | 102.6 |
| 32.0 | 92.6 | 102.5 |

The results are also shown in FIGS. 3 and 4.

The catalyst of Example 8 was tested under the same conditions as those of Example 6 and the results are presented in Table 7 below:

TABLE 7

AGING OF CATALYST OF EXAMPLE 8

| Days on Stream | Res. Oct. No. of $C_5^+$ Product | |
|---|---|---|
| | 0 ml. TEL | 3 ml. TEL |
| 1.5 | 96.0 | 104.9 |
| 2.5 | 95.5 | 104.1 |
| 3.5 | 95.2 | 103.9 |
| 4.5 | 94.8 | 104.3 |
| 5.5 | 95.5 | 104.0 |
| 7.5 | 94.7 | 103.9 |
| 9.5 | 94.4 | 103.7 |
| 11.5 | 94.3 | 103.6 |
| 13.5 | 94.3 | 103.7 |
| 15.5 | 93.9 | 103.0 |
| 17.5 | 93.2 | 103.1 |
| 19.5 | 93.1 | 102.5 |
| 21.5 | 93.0 | 102.6 |
| 23.5 | 92.8 | 102.8 |
| 25.5 | 92.6 | 102.6 |
| 27.5 | 92.8 | 102.0 |
| 29.2 | 92.8 | 102.4 |
| 31.8 | 92.9 | 101.7 |

The results are also shown in FIGS. 3 and 4.

The aging rates of catalysts of Examples 6, 7 and 8 during processing of reformate under the standardized conditions are compared in FIGS. 3 and 4. The decrease in product octane number with increasing time on stream is a measure of the aging. Referring to these figures, it is evident that lower aging is associated with the catalyst made with the smaller particles of ZSM-5. It is of further interest to note that the only significant difference of the preparation of the catalysts of Examples 6 and 8 was that the ZSM-5 crystallization step was at 320°F. in Example 6 but at 225°F. in Example 8. It is believed that this difference in crystallization temperature accounts, at least in part, for the smaller ultimate particle size of the catalyst of Example 8 and that such difference in the ZSM-5 particle size in turn accounted for the lower aging rate of such catalyst sample.

EXAMPLE 9

A reaction mixture was prepared by substantially the same procedure as that of Example 8 except for one substantive difference; crystallization temperature was 320°F. rather than 220°F. Two solutions, designated as Solution A and Solution B were intimately mixed. Solution A was prepared by stirring into 57.5 pounds of water

| 3.11 | lbs. | of | $Al_2(SO_4)_3 \times H_2O$ | (MW = 595) |
| 11.5 | lbs. | of | NaCl | |
| 8.09 | lbs. | of | $H_2SO_4$ (97%) | |

Solution B was prepared by stirring into 56.4 lbs. of water, 97.0 lbs. of Q-brand water glass. Solutions A and B were nozzle-mixed and charged to the stirred 30 gallon autoclave of Example 1. The resultant gel was stirred for 1-2 hours, and then the stirrer was turned off. Then 6.54 lbs. of tri-n-propylamine, 5.63 lbs. of n-propyl bromide and 10.8 lbs. of methylethyl ketone were charged to the autoclave which was then closed and heated without stirring to 210°F. at which temperature it was held without stirring for 16 hours. Then the autoclave stirrer was started at a rotor speed of 290 rpm and temperature was raised during stirring to 320°F., and this condition was maintained for 4 hours, after which the autoclave was opened to the atmosphere to flash off residual organic matter and then cooled to room temperature. The product was discharged from the autoclave, water-washed to 0.01 weight percent residual chloride (based on samples dried at 1,100°F.), and dried at 250°F. to constant weight. The product obtained was crystalline and identified as 100 percent ZSM-5 by X-ray analysis. Photomicrographs indicated that the crystallite agglomerates were 0.5–1 micron in diameter and that the individual crystallites were platelets having 0.1 to 0.25-micron diameters.

The crystallites were then combined with hydrated alumina and extruded substantially as in Example 3. The dried extrudate was then calcined in nitrogen for 3 hours at 1,000°F. The calcined particles were $NH_4^+$ and $Ni^{++}$ exchanged by the procedures of Example 1 except that ammonium ion exchange involved 6 contacts with 1 N ammonium nitrate solution (5 cc/gm). After drying at 250°F. and calcining in air at 1,000°F., the catalyst contained 0.90 weight percent nickel.

The catalysts of Examples 6 and 9 and two others made previously by substantially the same procedures were each tested for aging and product yields under the same conditions as those depicted in FIGS. 3 and 4.

Figure 5:
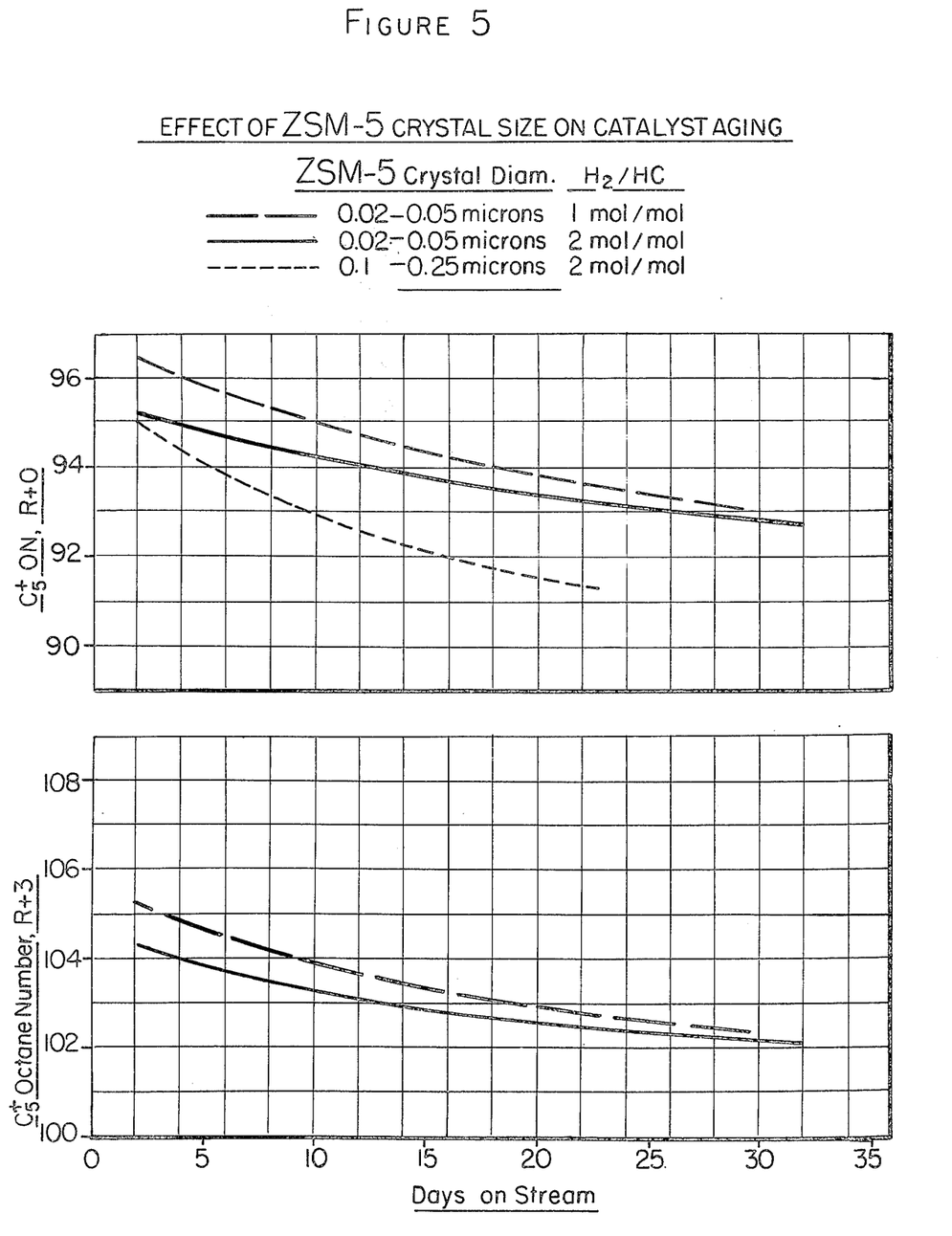
Figure 6:
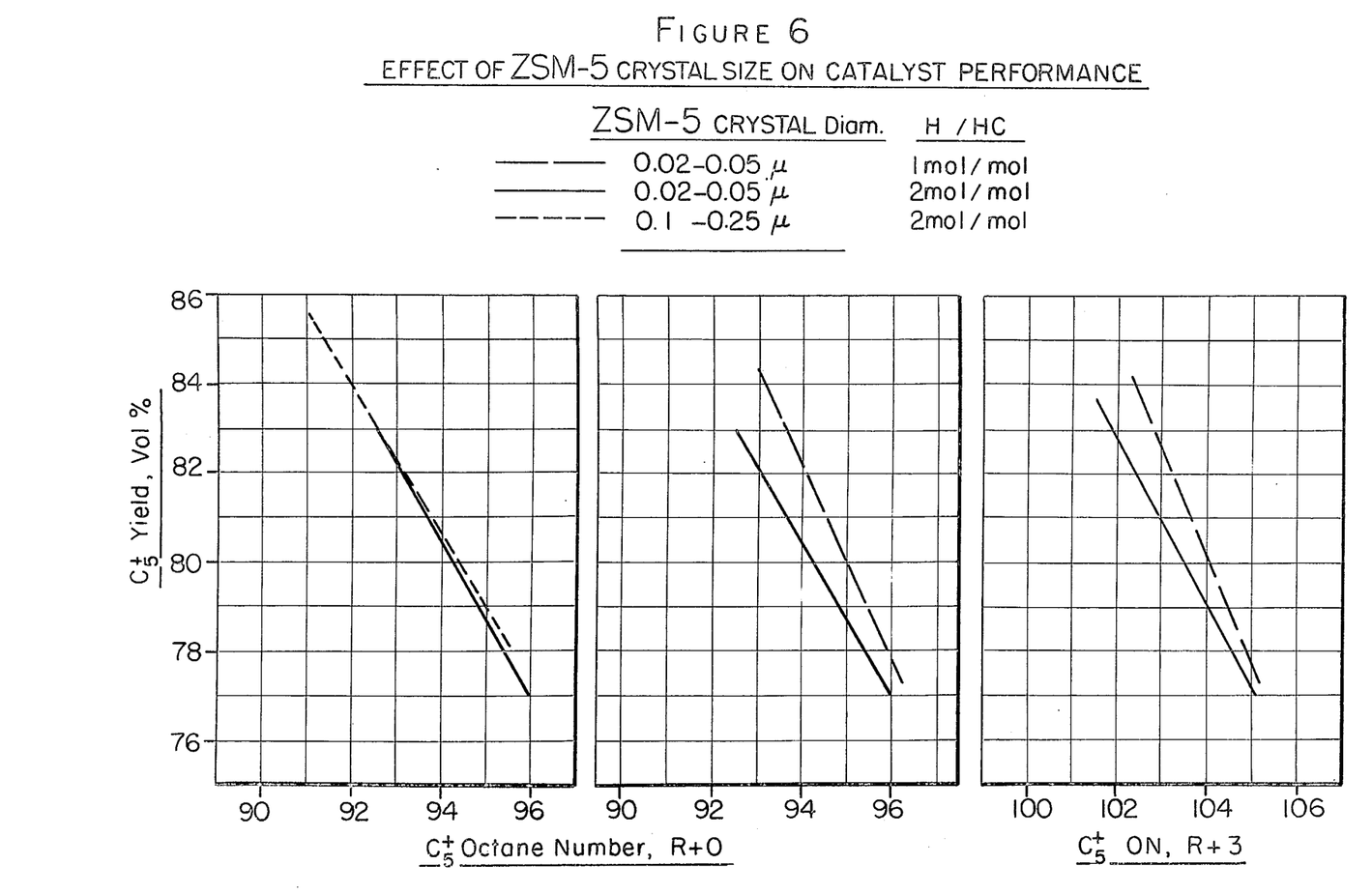

The results with the four catalysts were indistinguishable and were treated collectively on a statistical basis and are represented in FIGS. 5 and 6.

The results with the catalysts of Examples 7 and 8 were indistinguishable as to aging and product distribution and were treated collectively on a statistical basis and are represented in FIGS. 5 and 6.

The catalyst of Example 8 was tested for aging and product distribution in the same manner as were the catalysts of Examples 6 to 9 above, except that the molar ratio of hydrogen to hydrocarbon was 1. The results generated a relatively large number of data points that were treated on a statistical basis and are represented in FIGS. 5 and 6.

DISCUSSION OF EXAMPLES 6–9

FIG. 5 shows that significantly lower aging is associated with catalysts made with the smaller ZSM-5 crystallites under the same processing conditions. Moreover, this figure shows that when molar hydrogen-to-hydrocarbon ratio is reduced from 2/1 to 1/1 under the otherwise fixed test conditions of the Examples, the resulting increase in aging over catalysts made with the smaller crystallites is too small to bring the aging rate up to that with the catalysts having the larger crystallites at 2/1 hydrogen/hydrocarbon.

FIG. 6 shows that product selectivity (yield at fixed octane number, or octane number at fixed yield) is the same with catalysts having either size ZSM-5 crystallites under the same condition. However, this figure shows higher selectivity at 1/1 hydrogen/hydrocarbon than at 2/1 hydrogen/hydrocarbon. The straight lines plotted in this figure are lines of regression of Yield on Octane Number. At 94 unleaded research octane number, the 95 percent confidence limit for the plotted data is ±0.3 vol. percent for each of the four regression lines shown. Therefore, the 1.5 vol. percent greater yield at 94 clear octane number for 1/1 relative to 2/1 hydrogen/hydrocarbon is unquestionably significant. Thus, FIGS. 5 and 6, taken together, show that catalysts made with the 0.02 to 0.05-micron ZSM-5 are more stable than those made with 0.1 to 0.25-micron crystallites, and that this superior stability can be used to achieve improved selectivity through decreased hydrogen-to-hydrocarbon ratio while retaining satisfactory aging.

EXAMPLE 10

A catalyst was made by substantially the same procedure as that of Example 2 except for the following differences:

1. Solution A was prepared by stirring into 410 lbs. of water

| 7.3 | lbs. | of | $Al_2(SO_4)_3 \times H_2O$ (16.7 weight percent $Al_2O_3$) |
| 30 | lbs. | of | tetra-n-propylammonium bromide |
| 20 | lbs. | of | $H_2SO_4$ (97%) |
| 90 | lbs. | of | NaCl |

2. Solution B was prepared by stirring 240 lbs. of Q-brand water glass into 300 lbs. of water
3. The crystallization at 210°F. was at 24 rpm and lasted 8 days.
4. Photomicrographs indicated the crystallite agglomerates were 0.2–0.4 micron in diameter and the individual crystallites were 0.02–0.03 micron in diameter.
5. The dried crystallites were mixed with hydrated alumina, extruded and processed through ammonium ion exchange as in Example 3. After that exchange, the extrudate was washed free of residual chloride ions and dried at 250°F.

EXAMPLE 11

A catalyst was made from the catalyst of Example 10 by nickel ion exchange and subsequent drying and calcining as in Example 3. It contained 0.73 weight percent nickel.

EXAMPLE 12

A catalyst was made by calcining the catalyst of Example 10 in air at 900°F. for 3 hours.

EXAMPLE 13

The reaction of benzene and diethylbenzene to produce ethylbenzene was performed over the catalyst of Example 10 at 260 psig during 57 days in which temperature was varied from 800° to 900°F.; WHSV, from 11 to 80; and molar ratio of benzene to diethylbenzene, from 2.5 to 11. The catalyst was, in effect, calcined by the steps of going on stream. An exemplary result is the following (from the third day on stream) at 800°–805°F., 38.4 WHSV and 11.1 mole benzene/mole diethylbenzene. Diethylbenzene conversion was 59.4 weight percent and, composition of the liquid product was:

| | Wt., % |
|---|---|
| Material boiling below benzene | 0.02 |
| Benzene | 79.3 |
| Material boiling between benzene and ethylbenzene | 0.2 |
| Ethylbenzene | 13.1 |
| Xylenes, cumenes, etc. | 0.3 |
| Material boiling between xylenes, etc., and diethylbenzenes | 1.4 |
| Diethylbenzenes | 5.4 |
| Material boiling above diethylbenzenes | 0.3 |

There was also produced 0.8 cc of gaseous product per gram of charge.

EXAMPLE 14

The run of Example 13 was continued for 9 more days in which the reaction of benzene and ethylene to form ethylbenzene was carried out over the catalyst of Example 10 at 260 psig, 800°–825°F., 95-97 WHSV based on total feed, and 6.4–7.2 molar ratio of benzene to ethylene. An exemplary result is the following (from the 64th day on stream, i.e. the 7th day with benzene plus ethylene as charge) at 810°–825°F., 95 WHSV and 6.8 mole benzene/mole ethylene. Production of ethylbenzene was 119 weight percent of the benzene converted, and composition of the liquid product was:

| | Wt., % |
|---|---|
| Material boiling below benzene | 0.05 |
| Benzene | 79.2 |
| Toluene | 0.1 |
| Ethylbenzene | 17.6 |
| Material boiling between ethylbenzene and diethylbenzenes | 0.1 |
| Diethylbenzenes | 3.0 |
| Material boiling above diethylbenzenes | 0.0 |

There was also produced 2.1 cc of gaseous product per gram of charge.

EXAMPLE 15

A mixture of equal weights of benzene and n-heptane was processed over the catalyst of Example 11 at 750°F., 400 psig, 40 WSHV and 7/1 molar hydrogen/hydrocarbon to produce alkylbenzenes. A material balance run after about an hour on stream showed a n-heptane conversion of 81 weight percent and a benzene conversion (to alkylbenzenes) of 23 weight percent.

EXAMPLE 16

The feedstock of Example 15 was processed over the catalyst of Example 12 at 600°F., 400 psig, 9.8 WHSV and 3/1 molar hydrogen/hydrocarbon. A material balance run after about an hour on stream showed a n-heptane conversion of 78 weight percent and a benzene conversion to alkylbenzenes of 29 weight percent.

EXAMPLE 17

Propylene was converted to a mixture of higher molecular weight olefins and ethylene over the catalyst of Example 10 in the absence of hydrogen at atmospheric pressure, 600°–830°F. and 385–743 WHSV. In an exemplary run at 600°F. and 385 WHSV, propylene conversion was 76 weight percent and the composition of the product other than propylene was:

|  | Wt., % |
|---|---|
| Ethylene | 2.0 |
| Propane | 4.8 |
| Butenes | 38.2 |
| Pentenes | 23.0 |
| Hexenes | 15.8 |
| Heptenes | 10.6 |
| Octenes | 5.0 |
| Nonenes | 0.6 |

EXAMPLE 18

An equivolume mixture of benzene and n-octane was processed in the absence of hydrogen over the catalyst of Example 10 to produce alkylbenzenes at atmospheric pressure, 600°–900°F. and 4-50 WHSV. In an exemplary run at 900°F. and 8 WHSV, n-octane conversion was 96 weight percent and the product of that conversion was:

|  | Wt., % |
|---|---|
| $C_1 - C_4$ hydrocarbons | 64.0 |
| Non-aromatics boiling above butane | 5.0 |
| Alkyl groups attached to aromatic rings | 19.8 |
| New aromatic rings | 11.2 |

EXAMPLE 19

A catalyst was made by substantially the same procedures as that of Examples 10 and 11 except for the following differences:

1. There was no nozzle mixing. Instead 160 lbs. of Q-brand water glass were stirred into 200 pounds of water and the resulting solution was charged to the crystallizer. With the stirrer turned on, a solution of 20 lbs. of tetra-n-propylammonium bromide in 100 lbs. of water was added to the crystallizer. A solution of 2 lbs. of sodium aluminate (41.8 weight percent $Al_2O_3$, 33.5 weight percent $Na_2O$) in 50 lbs. of water was then added to the crystallizer; this was followed by a solution of 16 lbs. of $H_2SO_4$ (97 weight percent) in 50 lbs. of water; and finally 60 lbs. of NaCl in 70 lbs. of water was added to the crystallizer.
2. The crystallization at 210°F. lasted 11 days.
3. The product of crystallization was identified as 95 percent ZSM-5 by X-ray. Photomicrographs indicated that the agglomerates were 0.2–0.5 micron in diameter and the individual crystallites were 0.02–0.05 micron in diameter.
4. Nickel exchange was with 4.5 cc of nickel chloride/cc. of extrudate, and final nickel content was 0.95 weight percent.

EXAMPLE 20

Nominal 650–725°F. boiling range, high pour point Libyan gas oil was processed over the catalyst of Example 19 to reduce pour point for 50 days during which pressure was varied from 750 to 1500 psig; temperature, from 600° to 800°F.; LHSV from 0.8 to 8.6; and hydrogen circulation, from 4750 to 18,500 SCF of hydrogen/barrel of gas oil feed. The feed stock had a pour point of +70°F., an API gravity of 36.5°, a hydrogen content of 13.80 weight percent. An exemplary result (from the second day on stream) is the following at 750 psig, 600°F., 1.9 LHSV, and a hydrogen circulation of 5350 SCF/bbl. Product yields based on liquid charge were:

|  | Wt., % |
|---|---|
| $C_1 - C_3$ hydrocarbons | 5.7 |
| $C_4$ hydrocarbons | 9.8 |
| $C_5$ hydrocarbons | 8.2 |
| $C_6$ – 600°F. hydrocarbons | 14.6 |
| Material boiling above 600°F. | 61.7 |
| Percent olefins in $C_2 - C_3$ fraction | 14.5 |

Hydrogen consumption was 217 SCF/bbl. of feed. The total liquid product had an API gravity of 42.2° and a hydrogen content of 13.59 weight percent. The fraction boiling between 125° and 600°F. had an API gravity of 65.4°. The fraction boiling above 600°F. had a pour point of −35°F. and an API gravity of 31.6°.

EXAMPLE 21

Fluid cracking catalyst was made by incorporating lightly precoked calcined REY (Y zeolite exchanged with rare earth in an amount corresponding to about 18 weight percent rare earth oxide) and lightly precoked calcined ammonium ZSM-5 in a silica-clay matrix (60 weight percent $SiO_2$/40 weight percent clay); and then spray drying, base exchanging with ammonium sulfate to 0.08 weight percent residual sodium, calcining, and steaming the product. The final catalyst was 10 weight percent REY, 10 weight percent acid ZSM-5 and 80 weight percent silica-clay matrix. The reaction mixture that produced the ZSM-5 component of the catalyst was made by (1) stirring 5.60 lbs. of tetra-n-propylammonium bromide into 28.00 lbs. of water, (2) mixing the resulting solution with a solution of 44.70 lbs. of Q-brand water glass in 56.00 lbs. of water, (3) mixing the resulting solution with a solution of 0.56 lbs. of sodium aluminate (44.7 weight percent $Al_2 O_3$) in 14.00 lbs. of water and (4) adding to the resulting solution a solution of 4.47 lbs. of $H_2SO_4$ (97 weight percent) in 14.00 lbs. of water. The gel that was formed was partially broken up by stirring and was then digested for 167 hours at 200°–210°F. with occasional addition of water to make up for evaporation. The oven dried product of crystallization was identified as 90 percent ZSM-5 by X-ray; and photomicrographs indicated that the agglomerates were 0.25–0.5 micron in diameter, and the individual crystallites were about 0.02 micron in diameter.

EXAMPLE 22

Wide-range Mid-continent gas oil was cracked over the catalyst of Example 21 in a bench scale fixed fluidized bed cracking unit at 5 WHSV, 923°F. and a 2.4-minute catalyst residence time. Conversion to material boiling below 400°F. was 81.4 volume percent. Yields based on charge were:

| | |
|---|---|
| $C_5^+$ gasoline, vol. percent | 56.6 |
| Total $C_4$, vol. percent | 22.6 |
| Dry gas, weight percent | 11.4 |
| Coke, weight percent | 4.7 |
| $H_2$, weight percent | 0.02 |

We claim:

1. A process for hydrocarbon conversion which comprises contacting a hydrocarbon charge under conversion conditions with a catalyst comprising a ZSM-5 type crystalline zeolite characterized by an ultimate crystallite diameter of 0.005 to 0.1 micron as crystallized.

2. The process of claim 1 wherein said hydrocarbon conversion entails the upgrading of a reformate.

3. The process of claim 1 wherein said hydrocarbon conversion entails transalkylation of aromatic hydrocarbons.

4. The process of claim 3 wherein said transalkylation involves reaction of benzene and diethylbenzene.

5. The process of claim 1 wherein said hydrocarbon conversion entails alkylation of aromatic hydrocarbons.

6. The process of claim 5 wherein said alkylation involves reaction of benzene and ethylene.

7. The process of claim 1 wherein said hydrocarbon conversion entails reduction in the pour point of a fuel oil.

8. The process of claim 7 wherein said conversion is carried out at a temperature of 600° to 800°F, a pressure of 750 to 1,500 psig, liquid hourly space velocity of 0.8 to 8.6 utilizing a hydrogen circulation of from 4750 to 18,500 SCF of hydrogen/barrel of oil feed.

9. The process of claim 1 wherein said hydrocarbon conversion entails catalytic cracking of hydrocarbons.

10. The process of claim 1 wherein the catalyst comprises a product resulting from thermal treatment of the ZSM-5 type crystalline zeolite.

11. A process for hydrocarbon conversion which comprises contacting a reformate at a temperature between about 500°F and 1,000°F at a pressure between about 25 and 2,000 psig and a liquid hourly spaced velocity between about 0.1 and about 250 with a catalyst comprising a ZSM-5 type crystalline zeolite characterized by an ultimate crystallite diameter of 0.005 to 0.1 micron as crystallized.

12. A process for hydrocarbon conversion which ccmprise contacting a reformate at a temperature between about 550°F and 900°F at a pressure between about 50 and 1,000 psig and a liquid hourly space velocity between about 1 and about 100 with a catalyst comprising a ZSM-5 type crystalline zeolite characterized by an ultimate crystallite diameter of 0.005 to 0.1 micron as crystallized.

* * * * *

UNITED STATES PATENT AND TRADEMARK OFFICE
CERTIFICATE OF CORRECTION

PATENT NO. : 3,926,782
DATED : December 16, 1975
INVENTOR(S) : C. J. PLANK, E. J. ROSINSKI and A. B. SCHWARTZ It is certified that error appears in the above—identified patent and that said Letters Patent are hereby corrected as shown below:

Column 10, line 52, "4.2" should be --4.3--.

Signed and Sealed this twenty-second Day of June 1976

[SEAL]

Attest:

RUTH C. MASON
Attesting Officer

C. MARSHALL DANN
Commissioner of Patents and Trademarks